United States Patent
Propheter-Hinckley et al.

(10) Patent No.: US 9,851,105 B2
(45) Date of Patent: Dec. 26, 2017

(54) SELF-COOLED ORIFICE STRUCTURE

(71) Applicant: United Technologies Corporation, Hartford, CT (US)

(72) Inventors: Tracy A. Propheter-Hinckley, Manchester, CT (US); Dominic J. Mongillo, West Hartford, CT (US); Joel H. Wagner, Wethersfield, CT (US); Mark F. Zelesky, Bolton, CT (US); Stanislav Kostka, Shrewsbury, MA (US); Timothy S. Snyder, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 257 days.

(21) Appl. No.: 14/790,970

(22) Filed: Jul. 2, 2015

(65) Prior Publication Data
US 2016/0003477 A1 Jan. 7, 2016

Related U.S. Application Data

(60) Provisional application No. 62/020,692, filed on Jul. 3, 2014.

(51) Int. Cl.
*F23R 3/06* (2006.01)
*F23R 3/00* (2006.01)

(52) U.S. Cl.
CPC ............... *F23R 3/06* (2013.01); *F23R 3/002* (2013.01); *F23R 3/005* (2013.01);
(Continued)

(58) Field of Classification Search
CPC ............ F23R 3/06; F23R 2900/03042; F23R 2900/03044; F23R 3/002; F23R 3/04;
(Continued)

(56) References Cited

U.S. PATENT DOCUMENTS

| 3,545,202 A | * | 12/1970 | Batt | F23R 3/08 |
| | | | | 431/352 |
| 4,132,066 A | * | 1/1979 | Austin, Jr. | F23R 3/06 |
| | | | | 60/752 |
| 4,653,278 A | | 3/1987 | Vinson et al. | |
| 4,694,247 A | | 9/1987 | Meili et al. | |

(Continued)

OTHER PUBLICATIONS

EP Extended Search Report dated Nov. 13, 2015.

*Primary Examiner* — Steven Sutherland
*Assistant Examiner* — Edwin Kang
(74) *Attorney, Agent, or Firm* — O'Shea Getz P.C.

(57) ABSTRACT

A self-cooled orifice structure that may be for a combustor of a gas turbine engine, and may further be a dilution hole structure, includes a hot side panel, a cold side panel spaced from the hot side panel, and a continuous inner wall extending between the hot and cold side panels and defining an orifice having a centerline and communicating axially through the hot and cold side panels. A plurality of end walls of the structure are in a cooling cavity that is defined in-part by the hot and cold side panels and the inner wall. Each end wall extends between and are engaged to the hot and cold side panels and are circumferentially spaced from the next adjacent end wall. A plurality of inlet apertures extend through the cold side panel and are in fluid communication with the cavity, and each one of the plurality of inlet apertures are proximate to a first side of a respective one of the plurality of end walls. A plurality of outlet apertures extend through the hot side panel and are in fluid communication with the cavity, and each one of the plurality of outlet apertures are associated with an opposite second side of a respective one of the plurality of end walls.

20 Claims, 4 Drawing Sheets

(52) U.S. Cl.
CPC ............... *F23R 2900/00019* (2013.01); *F23R 2900/03042* (2013.01); *F23R 2900/03044* (2013.01); *Y02T 50/675* (2013.01)

(58) Field of Classification Search
CPC .. F23R 3/045; F23R 3/12; F23R 2900/03043; F23R 2900/03045; F02C 7/18; F02C 7/08; F02C 7/264; F05D 2260/14; F05D 2260/202; F05D 2260/204; F05D 2260/2212; F05D 2260/2214; F05D 2260/22141
USPC .......................................................... 165/51
See application file for complete search history.

(56) References Cited

U.S. PATENT DOCUMENTS

| | | |
|---|---|---|
| 4,700,544 A | 10/1987 | Fucci |
| 7,093,439 B2 | 8/2006 | Pacheco-Tougas et al. |
| 7,614,235 B2 | 11/2009 | Burd et al. |
| 7,631,502 B2 | 12/2009 | Burd et al. |
| 8,910,481 B2 | 12/2014 | Kim et al. |
| 8,978,385 B2 | 3/2015 | Cunha |
| 9,052,111 B2 | 6/2015 | Erbas-Sen et al. |
| 9,057,523 B2 | 6/2015 | Cunha et al. |
| 2010/0242483 A1* | 9/2010 | Snyder ..................... F23R 3/06 60/748 |
| 2014/0190166 A1 | 7/2014 | Pidcock et al. |
| 2014/0338351 A1 | 11/2014 | Snyder et al. |
| 2015/0176434 A1 | 6/2015 | Gerendas et al. |
| 2015/0241063 A1 | 8/2015 | Bangerter et al. |
| 2016/0025006 A1* | 1/2016 | Propheter-Hinckley .. F02C 7/08 165/51 |

\* cited by examiner

FIG. 7

SELF-COOLED ORIFICE STRUCTURE

This application claims priority to U.S. Patent Appln. No. 62/020,692 filed Jul. 3, 2014.

BACKGROUND

The present disclosure relates to an orifice structure and, more particularly, to a self-cooled orifice structure of a gas turbine engine.

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases and thereby generate thrust.

The combustor section typically includes a wall assembly having an outer shell lined with heat shields that are often referred to as floatwall panels. Together, the panels define a combustion chamber. A plurality of orifices, such as dilution holes, are generally spaced circumferentially about the wall assembly and flow dilution air from a cooling plenum and into the combustion chamber to improve emissions, and reduce and control the temperature profile of combustion gases at the combustor outlet to protect the turbine section from overheating.

The orifices are generally defined by a grommet that extends between the heat shield panel and supporting shell with a cooling cavity defined therebetween. Improvements to the cooling of structures surrounding the orifices is desirable.

SUMMARY

A self-cooled orifice structure according to one, non-limiting, embodiment includes a hot side panel; a cold side panel spaced from the hot side panel; a continuous inner wall extending between the hot and cold side panels and defining an orifice having a centerline and communicating axially through the hot and cold side panels; and a plurality of end walls in a cooling cavity that is defined in-part by the hot and cold side panels and the inner wall, wherein each end wall of the plurality of end walls extend between and are engaged to the hot and cold side panels and are circumferentially spaced from the next adjacent end wall, and wherein a plurality of inlet apertures extend through the cold side panel and are in fluid communication with the cavity with each one of the plurality of inlet apertures being proximate to a first side of a respective one of the plurality of end walls, and wherein a plurality of outlet apertures extend through the hot side panel and are in fluid communication with the cavity with each one of the plurality of outlet apertures being associated with an opposite second side of a respective one of the plurality of end walls.

Additionally to the foregoing embodiment, the structure includes a continuous outer wall spaced radially outward from the inner wall and extending between and engaged to the hot and cold side panels.

In the alternative or additionally thereto, in the foregoing embodiment, the cooling cavity is substantially annular in shape.

In the alternative or additionally thereto, in the foregoing embodiment, each one of the plurality of end walls extend radially between and are engaged to the inner and outer walls.

In the alternative or additionally thereto, in the foregoing embodiment, each one of the plurality of outlet apertures is a film hole angled to create a film of cooling air in a common swirling, circumferential, direction about the centerline.

In the alternative or additionally thereto, in the foregoing embodiment, each end wall of the plurality of end walls is angled to assist in the swirling direction of the cooling air film.

In the alternative or additionally thereto, in the foregoing embodiment, each end wall of the plurality of end walls has a cooling passage communicating through the second side and in fluid communication between the cavity and a respective one of the plurality of outlet apertures.

In the alternative or additionally thereto, in the foregoing embodiment, the structure includes a plurality of cooling nodes projecting into the cavity from the hot side panel.

In the alternative or additionally thereto, in the foregoing embodiment, the plurality of cooling nodes extend between and are engaged to the hot and cold side panels.

In the alternative or additionally thereto, in the foregoing embodiment, the structure includes a plurality of fins engaged to the inner wall and projecting laterally into the orifice, wherein each fin of the plurality of fins is spaced circumferentially from the next adjacent fin and longitudinally extends in a spiraling orientation.

A combustor according to another, non-limiting, embodiment includes a liner disposed about an axis and defining in-part a combustion chamber located radially inward and a cooling plenum located radially outward, and wherein a first plurality of film holes are in the liner and are in fluid communication between the cooling plenum and the combustion chamber, and are orientated to create a first cooling air film across the liner in the combustion chamber; and an orifice structure engaged to the liner and including a hot side panel defining in-part the combustion chamber, a cold side panel spaced from the hot side panel and exposed to the cooling plenum, a continuous inner wall extending between the hot and cold side panels and defining an orifice having a centerline and communicating axially through the hot and cold side panels with respect to the centerline, and a plurality of end walls in a cooling first cavity that is defined in-part by the hot and cold side panels and the inner wall, wherein each end wall of the plurality of end walls extend between and are engaged to the hot and cold side panels and are circumferentially spaced from the next adjacent end wall, and wherein a plurality of inlet apertures extend through the cold side panel and are in fluid communication between the first cavity and the cooling plenum with each one of the plurality of inlet apertures being proximate to a first side of a respective one of the plurality of end walls, and wherein a plurality of outlet apertures extend through the hot side panel and are in fluid communication between the first cavity and the combustion chamber with each one of the plurality of outlet apertures being associated with an opposite second side of a respective one of the plurality of end walls.

Additionally to the foregoing embodiment, the structure has a continuous outer wall spaced radially outward from the inner wall and extending between and engaged to the hot and cold side panels.

In the alternative or additionally thereto, in the foregoing embodiment, the combustor includes a shell located radially outward from the liner, and wherein a cooling second cavity is located between the liner and the shell and defined at least in-part by the liner, the shell and the outer wall, and the cooling plenum is located radially outward from the shell with respect to the axis.

In the alternative or additionally thereto, in the foregoing embodiment, the second cavity is isolated from the first cavity by the outer wall.

In the alternative or additionally thereto, in the foregoing embodiment, the orifice is a dilution hole.

In the alternative or additionally thereto, in the foregoing embodiment, the orifice is an igniter hole.

In the alternative or additionally thereto, in the foregoing embodiment, the plurality of outlet apertures is a second plurality of film holes orientated to create a second air film flowing in a circumferential direction about the orifice for cooling the hot side panel.

In the alternative or additionally thereto, in the foregoing embodiment, the plurality of film holes is at least one micro-circuit exit of a plurality of at least one micro-circuit exits, and each one of the at least one micro-circuit exit is spaced circumferentially from the next adjacent at least one micro-circuit exit of the plurality of at least one micro-circuit exits.

In the alternative or additionally thereto, in the foregoing embodiment, the orifice structure includes a vascular engineered lattice structure in the cavity.

In the alternative or additionally thereto, in the foregoing embodiment, the orifice structure includes a plurality of fins engaged to the inner wall and projecting laterally into the orifice, wherein each fin of the plurality of fins is spaced circumferentially from the next adjacent fin and longitudinally extends in a spiraling orientation.

The foregoing features and elements may be combined in various combinations without exclusivity, unless expressly indicated otherwise. These features and elements as well as the operation thereof will become more apparent in light of the following description and the accompanying drawings. It should be understood, however, the following description and figures are intended to exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
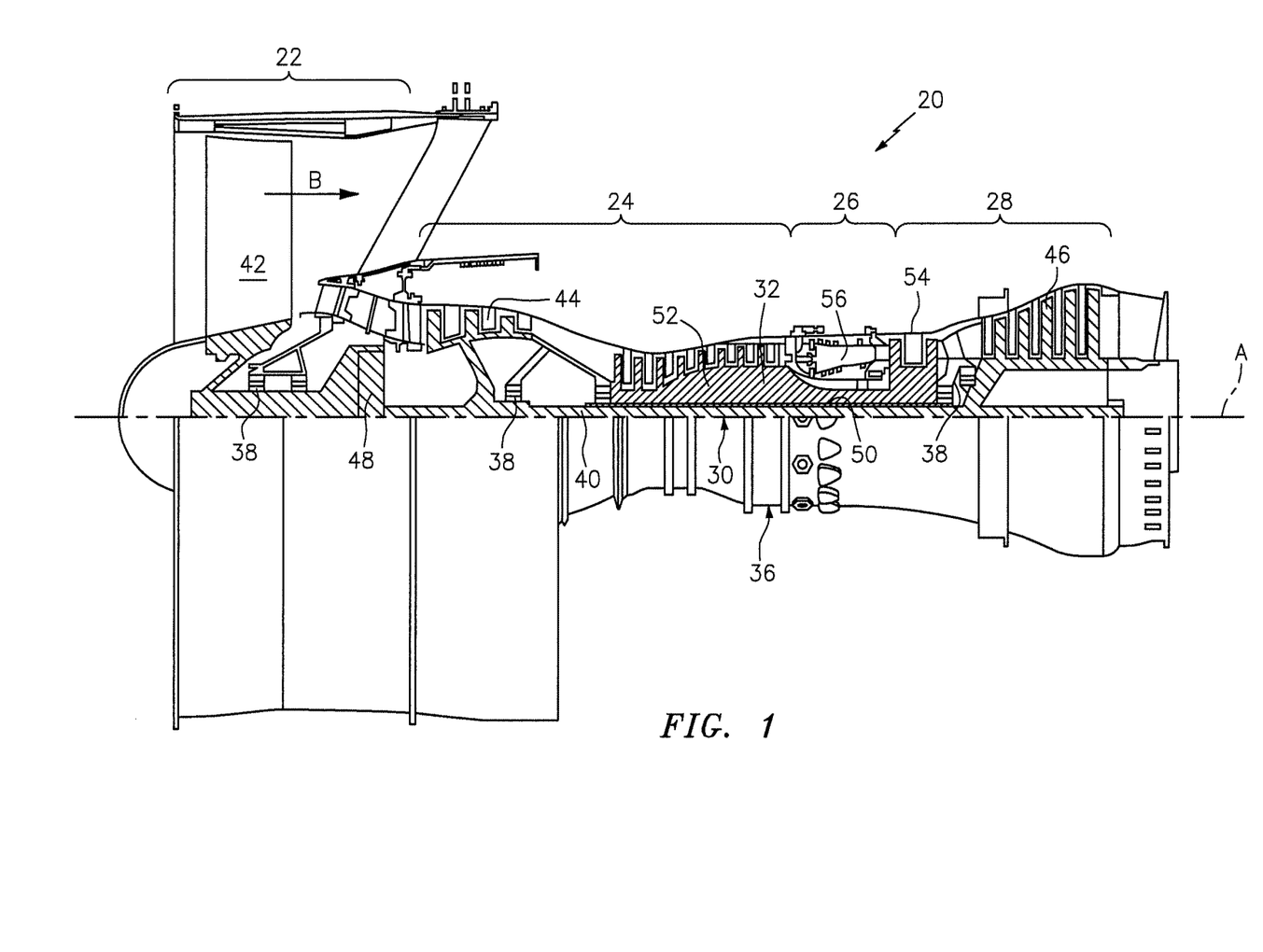
FIG. 1 is a schematic cross-section of a gas turbine engine.

FIG. 1 schematically illustrates a gas turbine engine 20 disclosed as a two-spool turbo fan that generally incorporates a fan section 22, a compressor section 24, a combustor section 26 and a turbine section 28. Alternative engines may include an augmentor section (not shown) among other systems or features. The fan section 22 drives air along a bypass flowpath (B) while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, and three-spool turbofans with an intermediate spool.

The engine 20 generally includes a low spool 30 and a high spool 32 mounted for rotation about an engine axis A via several bearing structures 38 and relative to a static engine case 36. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") of the compressor section 24 and a high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path B due to the high bypass ratio. The fan section 22 of the gas turbine engine 20 is designed for a particular flight condition—typically cruise at about 0.8 Mach and about 35,000 feet (10,668 meters). This flight condition, with the gas turbine engine 20 at its best fuel consumption, is also known as bucket cruise Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one non-limiting example of the gas turbine engine 20 is less than 1.45:1. Low Corrected Fan Tip Speed is the actual fan tip speed divided by an industry standard temperature correction of $(T/518.7^{0.5})$, where "T" represents the ambient temperature in degrees Rankine. The Low Corrected Fan Tip Speed according to one non-limiting example of the gas turbine engine 20 is less than about 1,150 feet per second (351 meters per second).

Figure 2:
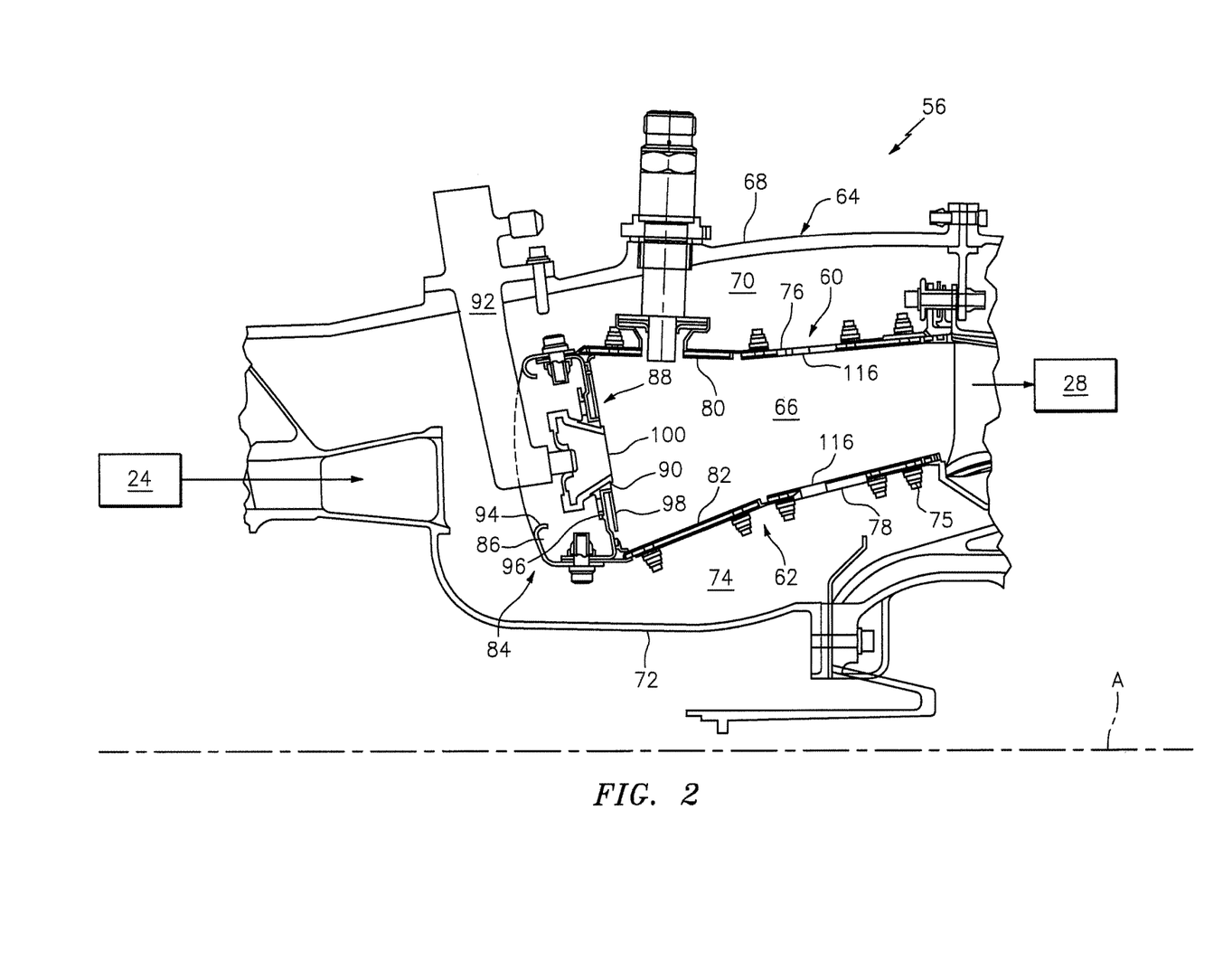
FIG. 2 is a cross-section of a combustor section.

Referring to FIG. 2, the combustor section 26 generally includes an annular combustor 56 with an outer combustor wall assembly 60, an inner combustor wall assembly 62, and a diffuser case module 64 that surrounds assemblies 60, 62. The outer and inner combustor wall assemblies 60, 62 are generally cylindrical and radially spaced apart such that an annular combustion chamber 66 is defined therebetween. The outer combustor wall assembly 60 is spaced radially inward from an outer diffuser case 68 of the diffuser case module 64 to define an outer annular plenum 70. The inner wall assembly 62 is spaced radially outward from an inner diffuser case 72 of the diffuser case module 64 to define, in-part, an inner annular plenum 74. Although a particular combustor is illustrated, it should be understood that other combustor types with various combustor liner arrangements will also benefit. It is further understood that the disclosed cooling flow paths are but an illustrated embodiment and should not be so limited.

The combustion chamber 66 contains the combustion products that flow axially toward the turbine section 28. Each combustor wall assembly 60, 62 generally includes a respective support shell 76, 78 that supports one or more heat shields or liners 80, 82. Each of the liners 80, 82 may be formed of a plurality of floating panels that are generally rectilinear and manufactured of, for example, a nickel based super alloy that may be coated with a ceramic or other temperature resistant material, and are arranged to form a liner configuration mounted to the respective shells 76, 78.

The combustor 56 further includes a forward assembly 84 that receives compressed airflow from the compressor section 24 located immediately upstream. The forward assembly 84 generally includes an annular hood 86, a bulkhead assembly 88, and a plurality of swirlers 90 (one shown). Each of the swirlers 90 are circumferentially aligned with one of a plurality of fuel nozzles 92 (one shown) and a respective hood port 94 to project through the bulkhead assembly 88. The bulkhead assembly 88 includes a bulkhead support shell 96 secured to the combustor wall assemblies 60, 62 and a plurality of circumferentially distributed bulkhead heat shields or panels 98 secured to the bulkhead support shell 96 around each respective swirler 90 opening. The bulkhead support shell 96 is generally annular and the plurality of circumferentially distributed bulkhead panels 98 are segmented, typically one to each fuel nozzle 92 and swirler 90.

The annular hood 86 extends radially between, and is secured to, the forward-most ends of the combustor wall assemblies 60, 62. Each one of the plurality of circumferentially distributed hood ports 94 receives a respective on the plurality of fuel nozzles 92, and facilitates the direction of compressed air into the forward end of the combustion chamber 66 through a swirler opening 100. Each fuel nozzle 92 may be secured to the diffuser case module 64 and projects through one of the hood ports 94 into the respective swirler 90.

The forward assembly 84 introduces core combustion air into the forward section of the combustion chamber 66 while the remainder of compressor air enters the outer annular plenum 70 and the inner annular plenum 74. The plurality of fuel nozzles 92 and adjacent structure generate a blended fuel-air mixture that supports stable combustion in the combustion chamber 66.

Figure 3:
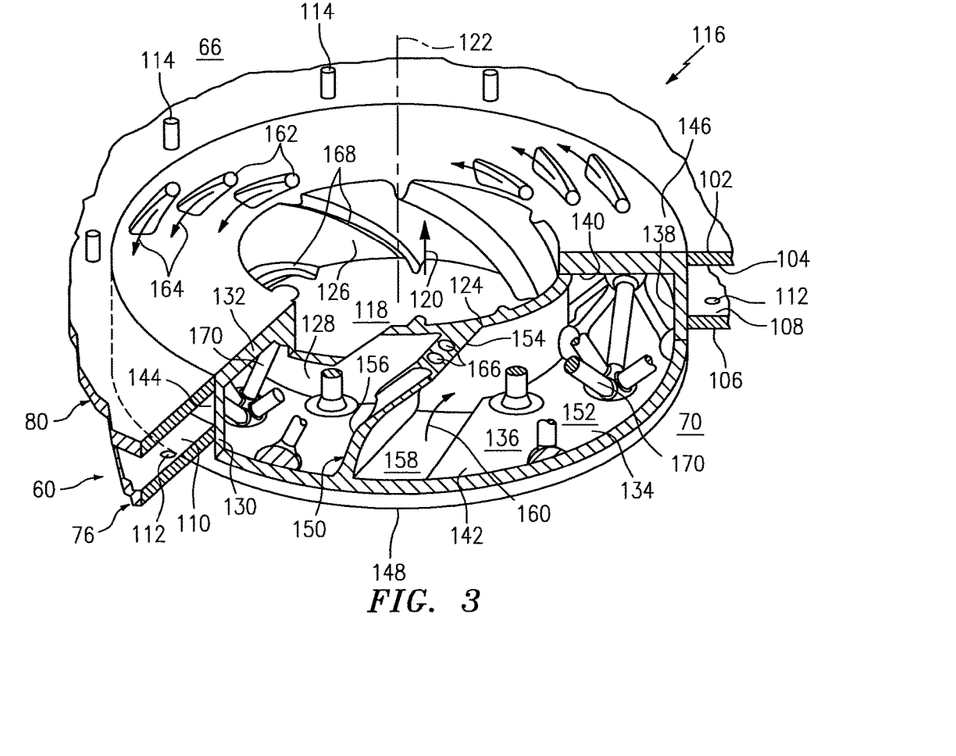
FIG. 3 is a perspective cross section of a self-cooled orifice structure according to one, non-limiting, example of the present disclosure.

Referring to FIG. 3, the heat resistant liner 80 of wall assembly 60 (which may include an array of panels) includes a hot side 102 that generally defines in-part a boundary of the combustion chamber 66 and an opposite cold side 104. The shell 76 includes an outer side 106 that faces and defines in-part a boundary of the cooling plenum 70 and an opposite inner side 108 that faces and is spaced from the cold side 104 of the liner 80. An annular cooling cavity 110 is located between and defined by the cold side 104 of the liner 80 and the inner side 108 of the shell 76.

The shell 76 may include a plurality of impingement holes 112 that flow cooling air from the cooling plenum 70 and into the cooling cavity 110 for flow impingement against the cold side 104 of the liner 80. From the cooling cavity 110, cooling air may flow through a plurality of film holes 114, communicating through the liner 80, and into the combustion chamber 66. The film holes 114 may be orientated to form a cooling air film across the hot side 102 of the liner 80 to thermally protect the liner from hot combustion air gases. Unfortunately, and in traditional designs, the wall assembly 60 may further include orifices that communicate directly between the cooling plenum 70 and the combustion chamber 66. Such orifices may be generally isolated from the cooling cavity 110 and generally interrupt the more conventional cooling air films formed across the hot side 102 of the liner 80 by the film holes 114 creating difficulties in properly cooling the structures that surround the problematic orifice. Examples of such orifices may include dilution holes, igniter holes and other orifices not necessarily limited to combustors.

A non-limiting example of a self-cooled orifice structure 116 of the present disclosure is illustrated wherein an orifice 118 of the structure 116 is shown as a dilution hole in the outer wall assembly 60. However, it is understood that the same orifice structure 116 may be applied to the inner wall assembly 62 of the combustor 56, applied to igniter holes (not shown), or, applied in any application where orifices in a liner or hot panel may interrupt cooling air filming of such panels. In the present example, the orifice or dilution hole 118 of the orifice structure 116 generally functions to flow dilution air (see arrow 120) from the cooling plenum 70, through the wall assembly 60, via the orifice structure 116, and into the combustion chamber 66. The dilution air 120 may generally enter the combustion chamber 66 as a jet stream to improve combustion efficiency throughout the chamber 66 and may further serve to cool and/or control the temperature profile of combustion gases at the exit of the combustor 56.

The self-cooled orifice structure 116 may include a centerline 122, a continuous inner wall 124 having an inner face 126 defining the orifice 118 and an opposite outer face 128, a continuous outer wall 130 spaced radially outward from the inner wall, a hot side panel 132 that extends between and is engaged to continuous ends of the inner and outer walls 124, 130, and a cold side panel 134 that extends between and is engaged to continuous opposite ends of the inner and outer walls 124, 130. A substantially annular cooling cavity 136 of the structure 116 is radially defined by and between the outer face 128 of the inner wall 124 and an inner face 138 of the outer wall 130, and is axially defined by and between a cold surface 140 of the hot side panel 132 and a first surface 142 of the cold side panel 134. An outer face 144 of the outer wall 130 (i.e. opposite the inner face 138) defines in-part the cooling cavity 110 and generally isolates (i.e. no flow through) the cooling cavity 110 from the cooling cavity 136 of the structure 116. A hot surface 146 of the hot side panel 132 (i.e. opposite the cold surface 140) defines in-part the combustion chamber 66 and may generally be flush with the hot side 102 of the liner 80. A second surface 148 of the cold side panel 132 is generally opposite the first surface 142 and is generally exposed to and/or defines in-part the cooling plenum 70.

The orifice structure 116 may further include a plurality of angled end walls 150 located in the annular cooling cavity 136. Each end walls 150 is circumferentially spaced from the next adjacent end wall and may extend radially between and is engaged to the opposing outer and inner faces 128, 138. Each end wall 150 also may extend circumferentially and axially (i.e. angled) between and are engaged to the opposing surfaces 140, 142. That is, and in the presently illustrated example, each end wall extends in a downstream, axial, direction from the surface 142 and to the surface 140 while also extending in a circumferential counter-clockwise direction. The cooling cavity 136 is thus divided into a plurality of circumferentially extending segments 152 by the end walls 150 such that a first side 154 of one end wall 150 generally defines an upstream end of one segment 152 and an opposite side 156 of the next adjacent end wall 150 generally defines a downstream end of the segment 152. It is also contemplated and understood that the end walls 150 may extend in a circumferential clockwise direction.

A plurality of inlet apertures 158 extend through the cold side panel 134 with each aperture being proximate to a respective first side 154 of the plurality of end walls 150 for flowing cooling air streams (see arrow 160) from the cooling plenum 70 and into the upstream end of the respective segments 152 of the cooling cavity 136. The first sides 154 of the end walls 150 generally redirect the air streams 160 from an axial direction and into a counter-clockwise circumferential direction. Each aperture 158 may be generally orthogonal in shape and span completely between the outer and inner faces 128, 138. Alternatively, the apertures 158 may be a multiple of apertures or take the form of any variety of shapes to create the necessary flow dynamics within the cooling cavity 136 and support the general cooling of the structure 116.

A plurality of outlet apertures 162 extend through the hot side panel 132 with each aperture being proximate to respective end walls 150 and the respective downstream ends of the segments 152 of the cooling cavity 136. Each outlet aperture 162 associated with each segment 152 may actually be a multiple of apertures (three illustrated). The number, size and distribution of outlet apertures is that which is needed to create a counter-clockwise, swirling, film of cooling air (see arrows 164) over the hot surface 146 of the hot side panel 132. The outlet apertures 162 may be angled film holes having various contours (e.g. shoots) and as typically known in the film hole art.

Each end wall 150 may further have and define a plurality of cooling passages 166 for further cooling the end wall portion nearest the hot side panel 132. Each cooling passage 166 extends through the side 156 of the end wall 150, and is in fluid communication between the downstream end of the segment 152 of the cooling cavity 136 and a respective outlet aperture 162. That is, each passage 166 feed cooling air to a respective outlet aperture 162. The passages 166 may be generally round or oval in cross section and may substantially conform to the general shape of the outlet apertures 162.

To enhance mixing of the jet air stream 120 with combustion gases in the combustion chamber and thereby improve emissions, the orifice structure 116 may include a plurality of fins 168. Each fin 168 is circumferentially spaced from the next adjacent fin, is engaged to the inner face 126 of the inner wall 124, laterally projects radially inward, and longitudinally extends in a spiraling fashion about the inner face 126. The plurality of fins 168 create a circumferential swirling action of the outer periphery of the jet air stream 120 and generally in the same circumferential direction as the flow of the air film 164 (e.g. counter-clockwise as illustrated, or alternatively clockwise).

Figure 4:
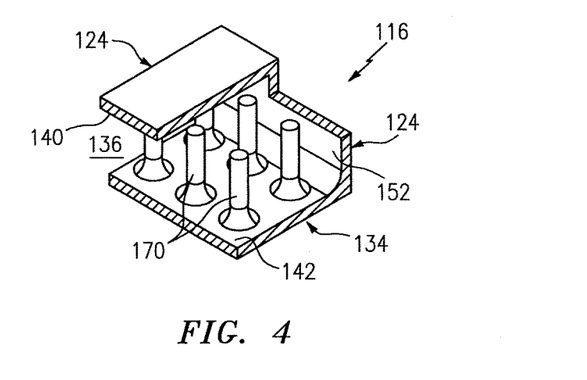
FIG. 4 is a partial, perspective, cross section of the self-cooled orifice structure.

Referring to FIGS. 3 and 4, the orifice structure 116 may further include a plurality of cooling nodes 170 projecting outward from the cold surface 140 of the hot side panel 124. The nodes 170 may be distributed across the surface 140 and in each segment 152 of the cooling cavity 136 to thermally conduct heat out of the hot side panel 124. As illustrated in FIG. 3, each node 170 may have a hub and a plurality of pedestals projecting outward from the hub in a grid-like pattern that may further provide structural support for the structure and add surface area for thermal convection via the cooling air stream 160 and turbulate the flow for enhanced cooling. The nodes 170, combined, may form a vascular engineered lattice structure within the cooling cavity 136. Such vascular structures are taught in U.S. Provisional Patent Application 61/757,441, filed Jan. 28, 2013 that claims priority to U.S. Provisional Patent Application 61/746,893, filed Dec. 28, 2012; both assigned to the United Technologies Corporation, Hartford, Conn.; and, incorporated herein by reference in their entirety. Alternatively, and as illustrated in FIG. 4, each node 170 may be a single pedestal generally projecting axially between and engaged to the opposing surfaces 140, 142.

Because applications of the orifice structure 116 (e.g. combustor dilution holes) may be relatively small, manufacturing of the structure may be accomplished through additive manufacturing. Through additive manufacturing, the structure 116 may be formed as one unitary part. Individual features may be as small as about 0.010 inches in thickness or diameter while being generally non-porous, and various holes may be generally as small as 0.012 inches in diameter and/or as dictated by the filtering of any undesired particulate within surrounding airstreams. It is further understood and contemplated that minimal dimensions may be reduced with continued improvements in additive manufacturing processes.

Figure 5:
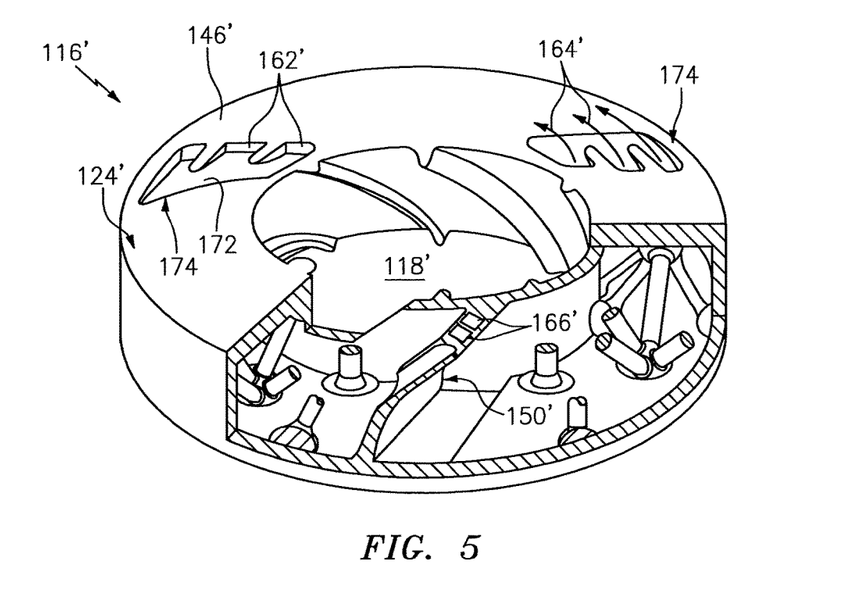
FIG. 5 is a perspective cross section of a second embodiment of a self-cooled orifice structure.

Referring to FIG. 5, a second embodiment of an orifice structure is illustrated wherein like elements have like identifying numerals except with the addition of a prime symbol. The second embodiment of an orifice structure 116' has a plurality of outlet apertures 162' (three illustrated) in a hot side panel 124' that flow cooling air upon a common diffuser ramp 172 of a hot surface 146' of the panel 124'. Together, the three (or plurality of) outlet apertures 162' and the common diffuser ramp 172 form a single micro-circuit exit 174. The gradual ramp 172 may enhance the distribution of cooling air across the hot surface 146' improving upon the formation of a swirling, cooling, film 164'. The apertures 162' may be low profiled and substantially orthogonal in cross section for enhanced air distribution upon the ramp 172. Similarly, cooling passages 166' in an end wall 150', and which feed air to the apertures 162', may be orthogonal in cross section. Each micro-circuit exit 174 may be associated with a respective end wall 150'; thus, the structure 116' has a plurality of micro-circuit exits 174 spaced circumferentially about a dilution hole 118'. It is further contemplated and understood that each end wall 150' may be associated with a plurality of micro-circuit exits 174.

Figure 6:
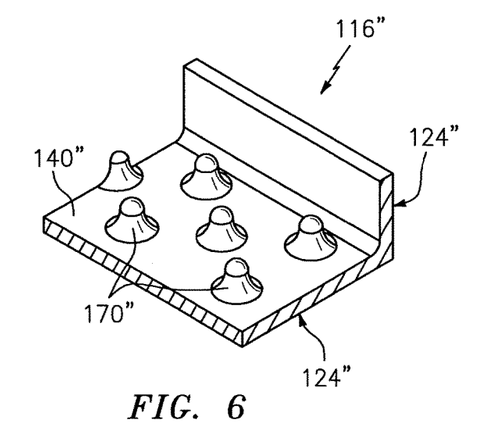
FIG. 6 is a partial, perspective, cross section of a third embodiment of a self-cooled orifice structure.

Referring to FIG. 6, a third embodiment of an orifice structure is illustrated wherein like elements have like identifying numerals except with the addition of a double prime symbol. The third embodiment of an orifice structure 116" may have a plurality of cooling nodes 170" projecting outward from a cold surface 140" of a hot side panel 124". The nodes 170" may be distributed across the surface 140". Each node 170" may generally be wart-like or nubbins.

Figure 7:
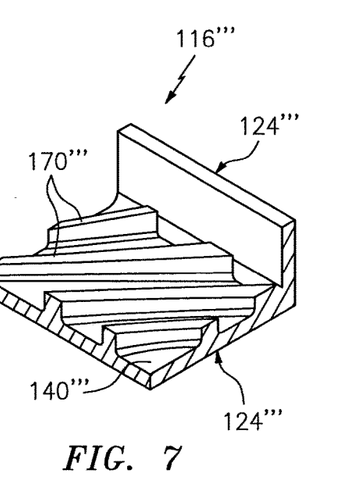
FIG. 7 is a partial, perspective, cross section of a fourth embodiment of a self-cooled orifice structure.

Referring to FIG. 7, a fourth embodiment of an orifice structure is illustrated wherein like elements have like identifying numerals except with the addition of a triple prime symbol. The fourth embodiment of an orifice structure 116''' may have a plurality of cooling nodes 170''' projecting outward from a cold surface 140''' of a hot side panel 124". The nodes 170''' may be distributed across the surface 140'''. Each node 170" may generally be elongated trip strips.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A self-cooled orifice structure in a combustor, the self-cooled orifice structure comprising:
    a hot side panel;
    a cold side panel spaced from the hot side panel;
    a continuous inner wall extending between the hot and cold side panels and defining an orifice having a centerline and communicating axially through the hot and cold side panels; and
    a plurality of end walls in a cooling cavity that is defined in-part by the hot and cold side panels and the continuous inner wall, wherein each end wall of the plurality of end walls extend between and are engaged to the hot and cold side panels and are circumferentially spaced from the next adjacent end wall, and wherein a plurality of inlet apertures extend through the cold side panel and are in fluid communication with the cooling cavity with each one of the plurality of inlet apertures being proximate to a first side of a respective one of the plurality of end walls, and wherein a plurality of outlet apertures extend through the hot side panel and are in fluid communication with the cooling cavity with each one of the plurality of outlet apertures being associated with an opposite second side of the respective one of the plurality of end walls.

2. The self-cooled orifice structure set forth in claim 1 further comprising:
    a continuous outer wall spaced radially outward from the inner wall and extending between and engaged to the hot and cold side panels.

3. The self-cooled orifice structure set forth in claim 2, wherein the cooling cavity is substantially annular in shape.

4. The self-cooled orifice structure set forth in claim 3, wherein each one of the plurality of end walls extend radially between and are engaged to the inner and outer walls.

5. The self-cooled orifice structure set forth in claim 1, wherein each one of the plurality of outlet apertures is a film hole angled to create a film of cooling air in a common swirling, circumferential, direction about the centerline.

6. The self-cooled orifice structure set forth in claim 5, wherein each end wall of the plurality of end walls is angled to assist in the swirling direction of the cooling air film.

7. The self-cooled orifice structure set forth in claim 1, wherein each end wall of the plurality of end walls has a cooling passage communicating through the opposite second side and in fluid communication between the cooling cavity and a respective one of the plurality of outlet apertures.

8. The self-cooled orifice structure set forth in claim 1 further comprising:
    a plurality of cooling nodes projecting into the cooling cavity from the hot side panel.

9. The self-cooled orifice structure set forth in claim 8, wherein the plurality of cooling nodes extend between and are engaged to the hot and cold side panels.

10. The self-cooled orifice structure set forth in claim 1 further comprising:
    a plurality of fins engaged to the inner wall and projecting laterally into the orifice, wherein each fin of the plurality of fins is spaced circumferentially from the next adjacent fin and longitudinally extends in a spiraling orientation.

11. A combustor comprising:
    a liner disposed about an axis and defining in-part a combustion chamber located radially inward and a cooling plenum located radially outward, and wherein a first plurality of film holes are in the liner and are in fluid communication between the cooling plenum and the combustion chamber, and are orientated to create a first cooling air film across the liner in the combustion chamber; and
    an orifice structure engaged to the liner and including a hot side panel defining in-part the combustion chamber, a cold side panel spaced from the hot side panel and exposed to the cooling plenum, a continuous inner wall extending between the hot and cold side panels and defining an orifice having a centerline and communicating axially through the hot and cold side panels with respect to the centerline, and a plurality of end walls in a cooling first cavity that is defined in-part by the hot and cold side panels and the inner wall, wherein each end wall of the plurality of end walls extend between and are engaged to the hot and cold side panels and are circumferentially spaced from the next adjacent end wall, and wherein a plurality of inlet apertures extend through the cold side panel and are in fluid communication between the cooling first cavity and the cooling plenum with each one of the plurality of inlet apertures being proximate to a first side of a respective one of the plurality of end walls, and wherein a plurality of outlet apertures extend through the hot side panel and are in fluid communication between the cooling first cavity and the combustion chamber with each one of the plurality of outlet apertures being associated with an opposite second side of the respective one of the plurality of end walls.

12. The combustor set forth in claim 11, wherein the orifice structure has a continuous outer wall spaced radially outward from the inner wall and extending between and engaged to the hot and cold side panels.

13. The combustor set forth in claim 12 further comprising:
a shell located radially outward from the liner, and wherein a cooling second cavity is located between the liner and the shell and defined at least in-part by the liner, the shell and the outer wall, and the cooling plenum is located radially outward from the shell with respect to the axis.

14. The combustor set forth in claim 13, wherein the cooling second cavity is isolated from the cooling first cavity by the outer wall.

15. The combustor set forth in claim 13, wherein the orifice is a dilution hole.

16. The combustor set forth in claim 13, wherein the orifice is an igniter hole.

17. The combustor set forth in claim 13, wherein the plurality of outlet apertures is a second plurality of film holes orientated to create a second air film flowing in a circumferential direction about the orifice for cooling the hot side panel.

18. The combustor set forth in claim 17, wherein the second plurality of film holes is at least one micro-circuit exit of a plurality of at least one micro-circuit exits, and each one of the at least one micro-circuit exit is spaced circumferentially from the next adjacent at least one micro-circuit exit of the plurality of at least one micro-circuit exits.

19. The combustor set forth in claim 11, wherein the orifice structure includes a vascular engineered lattice structure in the cooling first cavity.

20. The combustor set forth in claim 11, wherein the orifice structure includes a plurality of fins engaged to the inner wall and projecting laterally into the orifice, wherein each fin of the plurality of fins is spaced circumferentially from the next adjacent fin and longitudinally extends in a spiraling orientation.

* * * * *